(12) United States Patent
Kluge et al.

(10) Patent No.: US 9,274,218 B2
(45) Date of Patent: *Mar. 1, 2016

(54) DISTANCE MEASUREMENT BETWEEN TWO NODES OF A RADIO NETWORK

(71) Applicant: Atmel Corporation, San Jose, CA (US)

(72) Inventors: Wolfram Kluge, Dresden (DE); Eric Sachse, Leipzig (DE)

(73) Assignee: Atmel Corporation, San Jose, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 13/849,166

(22) Filed: Mar. 22, 2013

(65) Prior Publication Data

US 2013/0288611 A1  Oct. 31, 2013

Related U.S. Application Data

(63) Continuation of application No. 12/649,205, filed on Dec. 29, 2009, now Pat. No. 8,405,543.

(60) Provisional application No. 61/141,501, filed on Dec. 30, 2008.

(30) Foreign Application Priority Data

Dec. 30, 2008 (DE) .......................... 10 2008 063 254

(51) Int. Cl.
*G01S 13/84* (2006.01)
*G01S 11/02* (2010.01)
(Continued)

(52) U.S. Cl.
CPC ................. *G01S 13/84* (2013.01); *G01S 11/02* (2013.01); *H04W 24/00* (2013.01); *H04W 64/00* (2013.01)

(58) Field of Classification Search
CPC ................................ G01S 11/02; G01S 13/84
See application file for complete search history.

(56) References Cited

U.S. PATENT DOCUMENTS 2,529,510 A  11/1950 Manley
3,713,149 A   1/1973 Bruner et al.
(Continued)

FOREIGN PATENT DOCUMENTS

DE  10 2004 042 231 A1  3/2006
WO     WO 02/01247 A2   1/2002

OTHER PUBLICATIONS

Office Action and English translation for German Patent Application 10 2009 060 592, Sep. 19, 2011.
(Continued)

*Primary Examiner* — Matthew M Barker
(74) *Attorney, Agent, or Firm* — Fish & Richardson P.C.

(57) ABSTRACT

In certain embodiments, a method includes transmitting, by a first node, a first signal with a first frequency. The method includes receiving a second signal with a second frequency by downmixing the second signal to an intermediate frequency. The method includes determining a first value of a first phase for the second frequency. The method includes transmitting a third signal with a third frequency, the first frequency and the third frequency having a frequency difference, and receiving a fourth signal with a fourth frequency, the second frequency and the fourth frequency having the frequency difference. The method includes determining a second value of the first phase for the fourth frequency. The first frequency and the second frequency are spaced apart by an amount of the intermediate frequency, and the third frequency and the fourth frequency are spaced apart by the amount of the intermediate frequency.

20 Claims, 5 Drawing Sheets

(51) Int. Cl.
 *H04W 64/00* (2009.01)
 *H04W 24/00* (2009.01)

(56) References Cited

U.S. PATENT DOCUMENTS

| | | | |
|---|---|---|---|
| 3,725,920 A | 4/1973 | Kupfer et al. | |
| 4,804,961 A | 2/1989 | Hane | |
| 5,220,332 A | 6/1993 | Beckner et al. | |
| 6,731,908 B2 | 5/2004 | Berliner et al. | |
| 8,274,426 B2 | 9/2012 | Lee | |
| 8,405,543 B2 | 3/2013 | Kluge et al. | |
| 2005/0190098 A1 | 9/2005 | Bridgelall et al. | |
| 2013/0288611 A1 | 10/2013 | Kluge et al. | |

OTHER PUBLICATIONS

Office Action and English translation for Chinese Patent Application 200910263720.6, Apr. 23, 2012.
Non Final Rejection issued in the U.S. Appl. No. 12/649,205 dated Jun. 8, 2012, 6 pages.
Notice of Allowance issued in the U.S. Appl. No. 12/649,205 dated Nov. 28, 2012, 8 pages.

DISTANCE MEASUREMENT BETWEEN TWO NODES OF A RADIO NETWORK

RELATED APPLICATIONS

This nonprovisional application is a continuation of U.S. application Ser. No. 12/649,205, filed Dec. 29, 2009, and entitled "Circuit and Method for Distance Measurement Between Two Nodes of a Radio Network," and claims priority to U.S. Provisional Application No. 61/141,501 filed Dec. 30, 2008, and to German Patent Application No. DE 102008063254.6, filed in Germany on Dec. 30, 2008.

BACKGROUND OF THE INVENTION

1. Field of the Invention

The present invention relates to a system, a circuit, and a method for distance measurement between two nodes of a radio network.

2. Description of the Background Art

In a radio network, it is desirable to locate the nodes of the radio network or to determine at least one distance between the nodes. As a result, for example, a defective node can be easily found. Slow movements of nodes, for example, a means of conveyance in a factory, can also be tracked. It is also possible to use the locating of the nodes in firefighting, when the nodes dropped by an airplane can be located and an increased temperature transmitted.

International Pat. Appl. No. WO 02/01247 A2 discloses a method for measuring the distance between two objects with the use of electromagnetic waves. An interrogation signal of a base station and a response signal of a portable code emitter are transmitted twice at different carrier frequencies. The carrier frequencies in this case are correlated; i.e., they are dependent on one another. The carrier frequencies are approximated to one another, so that a phase shift between the signals can be measured. The distance of the code emitter to the base station is calculated from this phase shift. The interrogation signal and the response signal can be transmitted at different carrier frequencies or at the same carrier frequencies. The carrier frequencies are altered for a renewed interrogation/response dialog.

If a transceiver of a node for a sensor network is laid out according to the industry standard 802.15.4 only for a half-duplex instead of for a full-duplex system, it cannot transmit and receive simultaneously. If said transceiver is to be used as an active reflector for phase measurement, the node therefore must store the phase of the received signal, for example, by a phase-locked loop and after switching from receiving to transmitting again use the same stored phase for transmitting. For example, during reception by an additional phase-locked loop, the crystal oscillator of the transceiver of the node functioning as the active reflector is adjusted so that the frequency and phase of the LO signal (LO—Local Oscillator) of the local oscillator match the receive signal. During switching to transmission, the additional phase-locked loop must be opened and the crystal oscillator now synchronized in frequency continues to run freely. As a result, the transceiver of the node functioning as the active reflector transmits with the same or proportional phase position and with the same frequency, as it had previously received a carrier signal. In this respect, very high requirements are placed on a free-running oscillator with regard to frequency stability and phase stability. Disturbances must be avoided, such as, for example, crosstalk of signals in the integrated circuit, which can cause phase changes.

U.S. Pat. No. 5,220,332 discloses a distance measuring system which has an interrogator and a transponder and enables nonsimultaneous measurement between two objects. A carrier signal is modulated with a (low-frequency) modulation signal with a variable modulation frequency to determine by a phase measurement or alternatively by a transit time measurement a distance from the change in the modulation signal.

U.S. Pat. No. 6,731,908 82 discloses a method for determining the distance between two objects for Bluetooth technology. In this case, the frequency is changed by frequency hops to measure a phase offset for multiple different frequencies. An object has a voltage-controlled crystal oscillator in a phase-locked loop (PLL), whereby the phase-locked loop is closed during the receiving and opened during the transmission, so that the receive signal and transmit signal have the same frequency. The phase of the local oscillator signal of the voltage-controlled crystal oscillator due to the synchronization by the PLL is thereby coherent to the received signal.

SUMMARY OF THE INVENTION

It is therefore an object of the invention to improve a method for distance measurement in a radio network as much as possible. Accordingly, a method for distance measurement between a first node and a second node of a radio network is provided. The radio network is formed, for example, according to the industry standard IEEE 802.15.1 or preferably according to the industry standard IEEE 802.15.4.

In an embodiment of the method, a first signal with a first frequency is transmitted by the first node and received by the second node by downmixing to a first intermediate frequency. The first signal is preferably generated by a local oscillator of the first node with the first frequency as a transmission frequency. Advantageously, the first signal is a first unmodulated carrier signal. An unmodulated carrier signal is, for example, a high-frequency sinusoidal oscillation. Preferably, the first frequency is varied between multiple first frequency values for the distance measurement.

A first value of a first phase can be determined by the second node for a first frequency value of the first frequency from the received first signal. Preferably, the second node determines the first value of the first phase in regard to a reference signal of the second node. Preferably, the value of the determined first phase is stored in the second node.

A second signal with a second frequency can be transmitted by the second node and received by the first node by downmixing by means of a local oscillator signal to a second intermediate frequency. The second signal is preferably generated by a local oscillator of the second node with the second frequency as the transmission frequency. Preferably, the second signal is a second unmodulated carrier signal.

A first value of a second phase can be measured by the first node from the received second signal for a first frequency value of the second frequency. Preferably, the first node determines the value of the second phase in regard to a reference signal of the first node. The measurements in this regard are made preferably in the intermediate frequency domain.

The first frequency and the second frequency are changed. For the change, a second frequency value of the first frequency and the first frequency value of the first frequency have a frequency difference. In addition, a second frequency value of the second frequency and the first frequency value of the second frequency also have a frequency difference. The frequency difference in this regard is sufficiently large to measure phase differences, based on this frequency difference. Preferably, the frequency difference is defined by a frequency interval of channels in the radio network.

A second value of the first phase is measured by the second node for the second frequency value of the first frequency. A second value of the second phase is measured by the first node for the second frequency value of the second frequency.

An amount of the first and second intermediate frequency can be the same. Both intermediate frequencies can have different signs, however.

The first frequency of the first signal and the second frequency of the second signal are spaced apart by an amount of the first and second intermediate frequency. The first node therefore transmits at the first frequency and receives at the second frequency for the distance measurement. The second node therefore transmits at the second frequency and receives at the first frequency for the distance measurement.

A distance between the first node and the second node is calculated from the first value and the second value of the first phase and from the first value and second value of the second phase and from the frequency difference.

Multiple values of the first phase and multiple values of the second phase are determined for the calculation for a plurality of frequency values. Advantageously, the determined values of the first phase and/or the second phase are transmitted to the first node as measured data via a communication service of the radio network for calculating the distance.

The invention has its object, further, to provide a circuit for a radio network node. Accordingly, a circuit of a radio network node is provided. The radio network is formed, for example, according to the industry standard IEEE 802.15.1 or preferably according to the industry standard IEEE 802.15.4.

The circuit can have a transceiver for receiving a first signal with a first frequency by downmixing to an intermediate frequency.

The circuit can have a phase measurement unit, which is set up to measure a first value of a first phase for a first frequency value of the first frequency.

The transceiver of the circuit can be set up to transmit a second signal with a first frequency value of a second frequency for determining a first value of a second phase. The determination in this case can occur by means of a circuit, set up for this purpose, of another node.

The control circuit can be set up to change the first frequency and the second frequency. In this regard, a second frequency value of the first frequency (after the change) and the first frequency value of the first frequency (before the change) have a frequency difference. A second frequency value of the second frequency (after the frequency change) has a frequency difference relative to the first frequency value of the second frequency (before the frequency change). The first frequency of the first signal and the second frequency of the second signal are spaced apart by an amount of the intermediate frequency.

The phase measurement unit can be set up to measure a second value of the first phase for the second frequency value of the first frequency after the frequency change.

The transceiver of the circuit can be set up to transmit the second signal with a second frequency value of the second frequency for determining a second value of the second phase. The determination of the second value can again occur by means of a circuit, set up for this purpose, of the other node.

The circuit can be set up to transmit the values of the first phase by means of the transceiver and/or to receive the values of the second phase. When the values of the second phase are received, the distance can be calculated by the circuit.

Another aspect of the invention can be a circuit of a radio network node, which has, for example, the aforementioned functions. The circuit has a control circuit, for example, in the form of an arithmetic unit, such as a microcontroller, which is set up to control a mode for distance measurement.

The circuit has a local oscillator for setting a transmission frequency for distance measurement. The local oscillator preferably has a phase-locked loop, an oscillator, and a frequency divider with a variable division factor.

The circuit has a sideband filter for filtering a receive signal of the distance measurement. Preferably, the circuit has in addition a mixer for downmixing a receive signal. The mixer is preferably connected to the local oscillator. The sideband filter is preferably formed as complex and/or differential. The sideband filter in one embodiment can also be called a single-sideband filter (SSBF).

The circuit can have a switching means, for example, a switch, which to control a switch position is connected to the control circuit. The switching means can have a number of switching transistors, whose control terminals are connected to the control circuit.

The sideband filter and the switching means can be connected for switching the filtering between the top sideband and the bottom sideband. This enables the circuit to operate with a different intermediate frequency position for the distance measurement. The switching of the filtering between the top sideband and the bottom sideband can be achieved, for example, by changing the phase relation of the mixer and of the sideband filter.

The control circuit can be set up to control the switching of the filtering as a function of the mode for distance measurement. For example, the control circuit initiates the mode for distance measurement and controls the switching means in a predefined switch position for distance measurement. Alternatively, the node receives a command to start the mode for distance measurement and controls the switching means in a predefined switch position as a function of the received command.

Another aspect of the invention is a system with a first node, preferably with an above-described circuit, and with a second node, preferably with an above-described circuit. The system comprising both nodes of the radio network is set up to carry out the above-described method.

The refinements described hereinafter refer to the method, as well as to the circuit and the system. Functional features of the circuit in this case emerge from the correspondingly set up process steps. Process steps can be derived from the functions of the circuit.

In an embodiment, the circuit is set up to calculate a distance to another node from the first value and second value of the first phase and from the first value and second value of the second phase and from the frequency difference, for example, by means of an arithmetic unit, such as a microcontroller.

According to an embodiment variant, the second signal is received by the first node. The received second signal in the bottom sideband passes through a first sideband filter of the first node below the first frequency of a first local oscillator. Preferably, the first signal is received by the second node. The received first signal in the top sideband passes through a second sideband filter of the second node above the second frequency of a second local oscillator. Accordingly, the other sidebands in each case are filtered out by the preferably complex sideband filters.

According to an embodiment, the first signal and the second signal are transmitted in a time interval with a time delay. To this end, the nodes are formed, for example, as a half-duplex system.

It is provided in another embodiment that the distance is calculated from a majority of determined values of the first phase and determined values of the second phase. The calculation occurs preferably by averaging or inverse fast Fourier transformation with an evaluation of amplitudes. Preferably, the frequency values of the first frequency and the second frequency are changed for a majority of determinations of the values of the first phase and the second phase. The frequency values of the transmission frequencies of the first node and of the second node in this case are changed preferably in the same direction, especially preferably with the same frequency offset. Preferably, in this case the distance of the frequency values of the transmission frequencies of the first node and of the second node does not change. The distance of the frequency values of the node transmission frequencies is preferably constant.

It is provided according to an embodiment that the first signal and the second signal for each change in the frequency values of the first frequency and the second frequency is transmitted in the same time interval delayed in time.

In a first embodiment variant, it is advantageously provided that the majority of determinations of the values of the first phase and the second phase for the changed frequency values of the first frequency and the second frequency in both nodes occurs equidistant in time to one another.

An embodiment provides that a time synchronization of the measurements of the values is performed. The time synchronization in this regard is performed in such a way that measurement times of the measurement of the values, therefore of the first, second, third, and fourth value, have a predefined temporal relationship to one another.

A first time interval and a second time interval can be the same. Preferably, the first time interval between a first measurement time of the first value of the first phase and a second measurement time of the second value of the first phase is defined. The second time interval is preferably defined between a third measurement time of the third value of the second phase and a fourth measurement time of the fourth value of the second phase. This temporal relationship has the effect that a third time interval as well between the first measurement time and the third measurement time is the same as a fourth time interval between the second measurement time and the fourth measurement time.

The time intervals embodiment predefined. The time intervals are therefore not determined first from the ongoing measurement. Preferably, the time intervals are fixedly predefined, for example, implemented as a set of parameters. Alternatively, the time intervals for a distance measurement as well can be agreed upon between the nodes. To this end, the nodes are set up accordingly. Advantageously, a respective circuit of nodes is set up to measure the values of phases at the time intervals by storing the phase value current at the measurement time, the values of the phases being determined continuously. Alternatively, the nodes are set up to measure the values of phase only at the measurement time and to store the measured value.

In an embodiment, a phase difference of the first value and the second value of the first phase and of the third value and fourth value of the second phase is calculated to determine the distance. The calculation is preferably performed using the formula:

$$\Delta\phi = (\phi_{A2} - \phi_{B2}) - (\phi_{A1} - \phi_{B1})$$

Here, the formula also comprises all algebraic conversions of its terms. In the formula, $\phi A1$ is the first value and $\phi A2$ is the second value of the first phase. $\phi B1$ is the third value and $\phi B2$ is the fourth value of the second phase.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Distance measurements in a radio network with multiple nodes can be based on phase measurements. In this case, a preferably unmodulated carrier signal with the frequency fa and an unmodulated carrier signal with the frequency fb are transmitted one after another. The frequencies differ only in a small difference frequency $\Delta f$. In the receiver, the phase of the received wave is evaluated and stored as measured values $\phi 1$ and $\phi 2$. The distance d between the stations can be calculated from this:

$$d = \frac{(\varphi 2 - \varphi 1)c}{2\pi \Delta f} \quad (1)$$

Here, c is the speed of light.

Figure 1A:
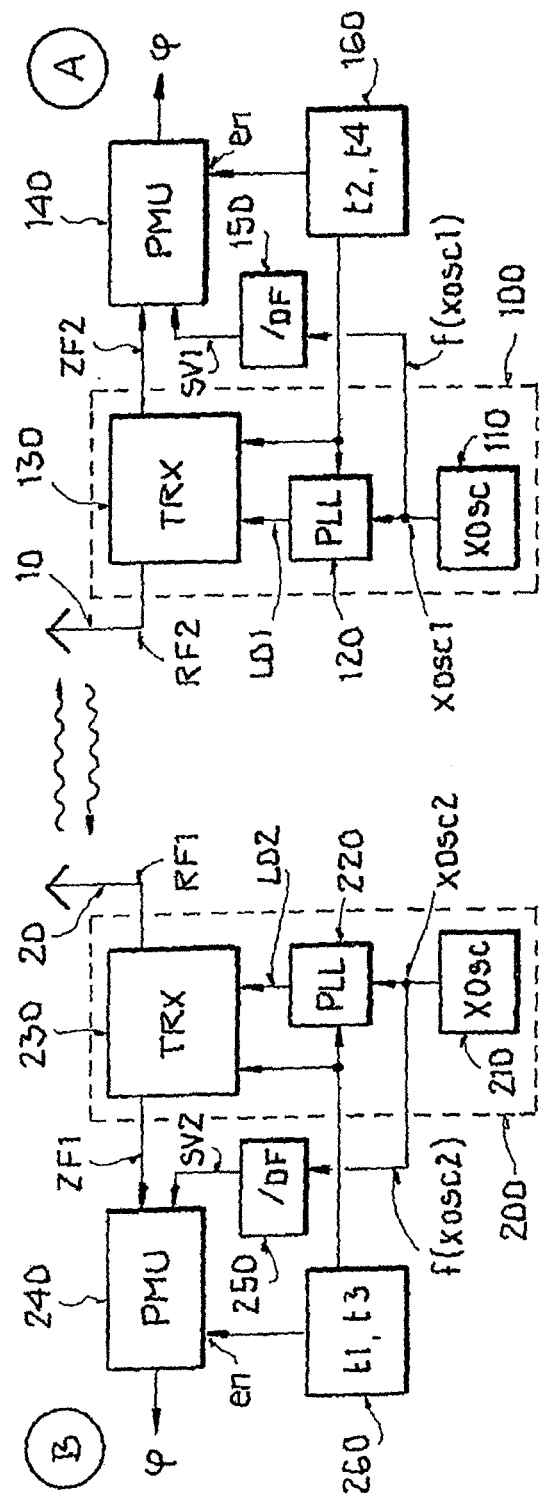
FIG. 1A shows a schematic block diagram of two nodes of a radio network.

Two circuits of a first node A and a second node B are shown in FIG. 1A. whereby none of the nodes A, B function as a mere active reflector. The circuit of the first node A has a transmitter/receiver circuit 130 (TRX), which is connected or connectable to an antenna 10 and is provided with a first local oscillator signal LO1 by a crystal oscillator 110 as a reference clock generator (XOSC1) and a phase-locked loop 120 (PLL). The arrangement comprising transmitter/receiver circuit 130, phase-locked loop 120, and reference clock generator 110 can also be called a radio 100.

The circuit of the first node A furthermore has a frequency divider 150, which in the exemplary embodiment of FIG. 1 divides the first reference frequency f(XOSC1) of the first reference signal XOSC1 of reference clock generator 110 by the division factor OF, for example, eight, to provide a first comparison signal SV1 with a frequency f(SV1), which is equal to an intermediate frequency ZF2 and is, for example, about 2 MHz. Inputs of a phase measurement unit 140 (PMU) of the circuit of the first node A are connected to frequency divider 150 and transmitter/receiver circuit 130. Transmitter/ receiver circuit 130 is formed for downmixing a carrier signal RF2, received by second node B, to an intermediate frequency signal ZF2. The intermediate frequency signal ZF2 in the exemplary embodiment of FIG. 1 has the intermediate frequency f(ZF2) of about 2 MHz.

The phase φ of the received signal RF2 is measured by phase measurement unit 140, which can also be called a phase detector. The measurement occurs in the intermediate frequency domain, because during the frequency conversion in a mixer of transmitter/receiver circuit 130, the phase position of the carrier signal RF2 transmitted by second node B is maintained. Phase measurement unit 140 is therefore formed to measure the phase difference between the intermediate frequency signal ZF2 and the divided-down reference frequency as comparison signal SV1. The measured values of the phase φ are preferably stored.

In the exemplary embodiment of FIG. 1A, the circuit of the second node B is made the same as that of the first node A. The circuit of the second node B also has a transmitter/receiver circuit 230, which can be or is connected to an antenna 20. Transmitter/receiver circuit 230 is provided with a second local oscillator signal LO2 by a crystal oscillator 210 as reference clock generator (XOSC2) and a phase-locked loop 220. The arrangement comprising transmitter/receiver circuit 230, phase-locked loop 220, and reference clock generator 210 can also be called a radio 200.

The circuit of the second node B also has a frequency divider 250 to provide a second reference signal SV2 at an input of a phase measurement unit 240. Frequency divider 250 for dividing down the reference frequency f(XOSC2) of second reference signal XOSC2 of reference clock generator 210 by the factor OF, for example, eight, is connected to reference clock generator 210 of the circuit of the second node. The phase φ of the received signal RF1 is measured using phase measurement unit 240. For this purpose, an input of phase measurement unit 240 is connected to an output of transmitter/receiver circuit 230. Phase measurement unit 240 is therefore formed to measure the phase difference between an intermediate frequency signal ZF1 and the comparison signal SV2. The measured values of the φ are preferably stored.

Reference clock generators 110 and 210 are formed as crystal oscillators and decoupled from one another. Because of fabrication variations or different temperatures, the first frequency f(XQSC1) of reference clock generator 110 of the first node A and the frequency f(XQSC2) of reference clock generator 210 of the second node B can deviate from one another. When the frequency f(XQSC1) of reference clock generator 110 of the first node A and the frequency f(XQSC2) of reference clock generator 210 of the second node B are unsynchronized, a time synchronization of the measurements of the phase in the first node A and the phase in the second node B is necessary to take into account the phase error caused by the frequency offset between the first reference clock generator and the second reference clock generator.

Figure 1B:
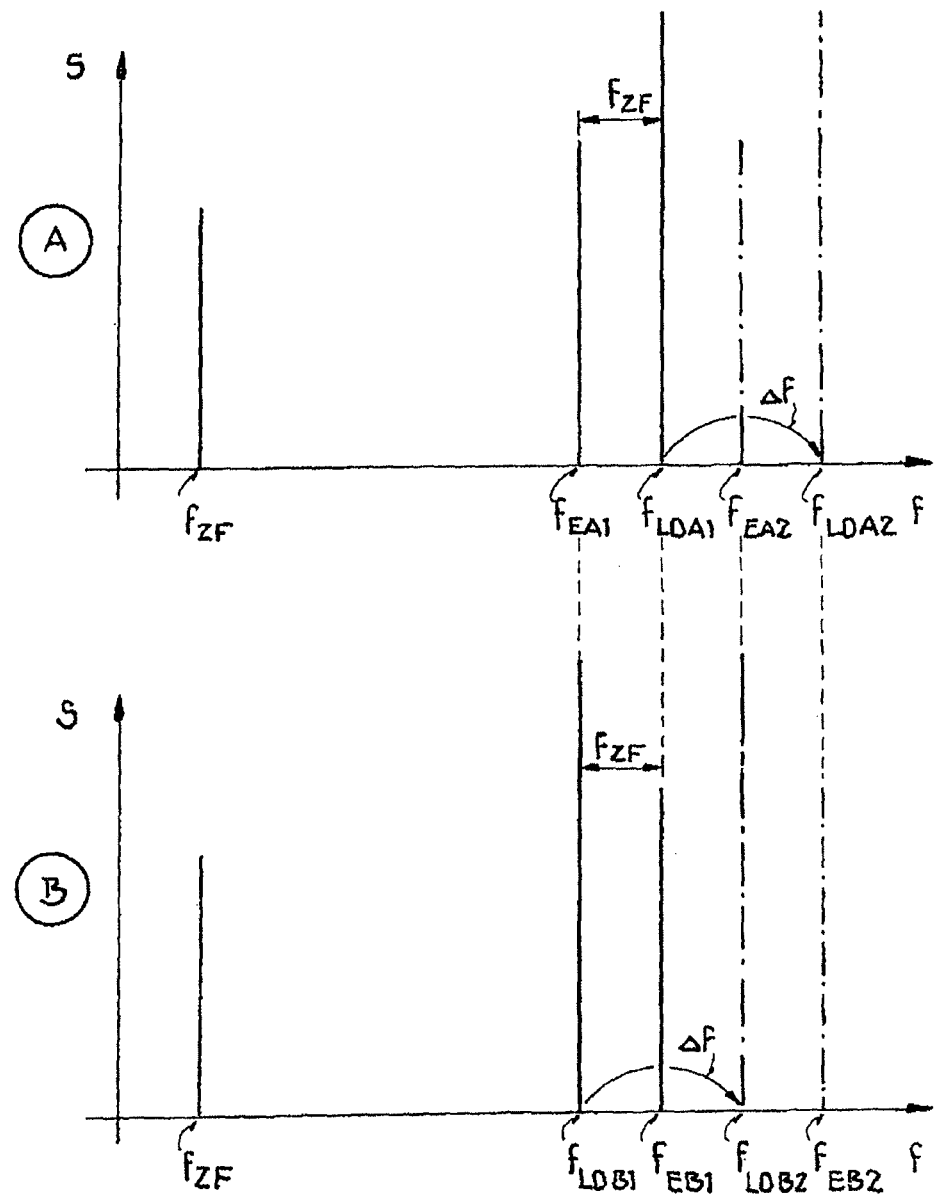
FIG. 1B shows a first schematic diagram.

A schematic diagram with frequencies is shown in FIG. 1B. Both nodes A, B shown in FIG. 1A use the same (low) intermediate frequency fZF of, for example, 2 MHz. In this case, only the amount of the intermediate frequency is shown in FIGS. 1A and 1B. The intermediate frequencies fZF differ by the sign (not shown). Both transmitter/receiver circuits (transceivers) of nodes A, B operate at different intermediate frequency positions. One of the transmitter/receiver circuits is switched to the opposite intermediate frequency position of the other node A/B by filtering of the corresponding sideband.

For example, the first node A transmits at the oscillator frequency $f_{LOA1}$=2404 MHz and receives at the reception frequency $f_{EA1}$=2402 MHz. The second node B then transmits at the oscillator frequency $f_{LOB1}$=2402 MHz and receives at the reception frequency $f_{EB1}$=2404 MHz. For the distance measurement, the oscillator frequencies $f_{LOA1}$ and $f_{LOB1}$ are changed by the same frequency step Δf, which may be positive or negative. If the frequency step Δf=+10 MHz, then the first node A transmits at the oscillator frequency $f_{LOA2}$=2414 MHz and receives at the reception frequency $f_{EA2}$=2412 MHz, whereby the second node B then transmits at the oscillator frequency $f_{LOB2}$=2412 MHz and receives at the reception frequency $f_{EB2}$=2414 MHz. Transmission frequency $f_{LOA1}$, $f_{LOA2}$, $f_{LOB1}$, $f_{LOB2}$ and reception frequency $f_{EA1}$, $f_{EA2}$, $f_{EB1}$, $f_{EB2}$ differ in each case by the same intermediate frequency fZF.

Therefore, the reception frequency of the first node A is above a frequency of the phase-locked loop 120 (PLL) to generate the local oscillator signal LO1 in the first node A and the reception frequency of the second node B is below a frequency of the phase-locked loop 220 (PLL) to generate the local oscillator signal LO2 in the second node B. It is especially advantageous in this regard that the frequency of phase-locked loops 120, 220 for two measurements in both directions need not be switched between the nodes A, B, so that no settling process of the phase-locked loop 120, 220 needs to occur. A better phase stability and therefore a higher measuring accuracy are achieved. Only after a frequency step Δf, do both phase-locked loops 120, 220 need to settle quickly.

Transmitter/receiver circuit 130 of the first node A has a differential complex mixer 310, 310' and a differential complex filter 320, 320'. Transmitter/receiver circuit 230 of the first node B also has a differential complex mixer 310, 310' and a differential complex filter 320, 320', as is schematically shown by way of example in FIGS. 4A and 4B.

For example, the signal RF, received in the first node A, is downmixed by means of a complex mixer 310, 310' to an intermediate frequency signal ZF and filtered by means of a first complex sideband filter 320, 320' of the first node A below the first oscillator frequency $f_{LOA1}$, $f_{LOA2}$ of the oscillator signal LO. The signal RF, received in the second node B, is downmixed by means of a complex mixer 310, 310' to an intermediate frequency signal ZF and filtered by means of a second complex sideband filter 320, 320' of the second node B above the second oscillator frequency $f_{LOB1}$, $f_{LOB2}$. The two exemplary embodiments of FIGS. 4A and 4B can be used alternatively in this case.

Figure 4A:
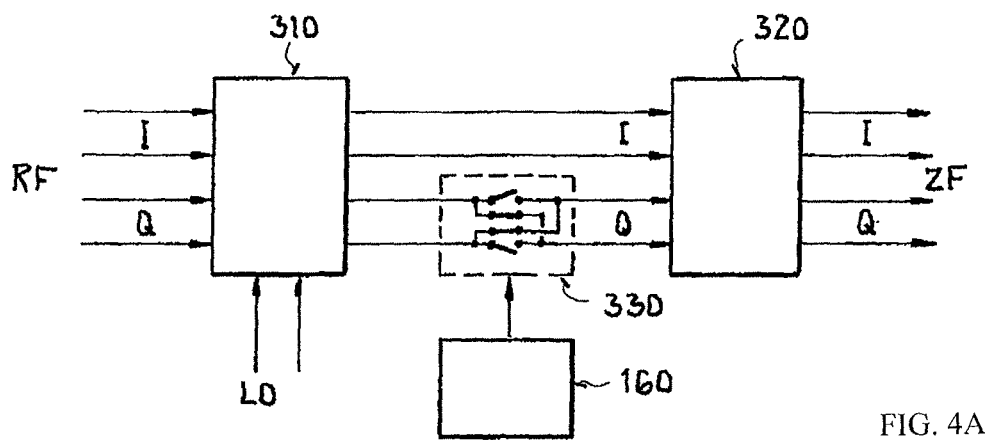
FIGS. 4A and 4B show schematic block diagrams of a part of a receiver.
Figure 4B:
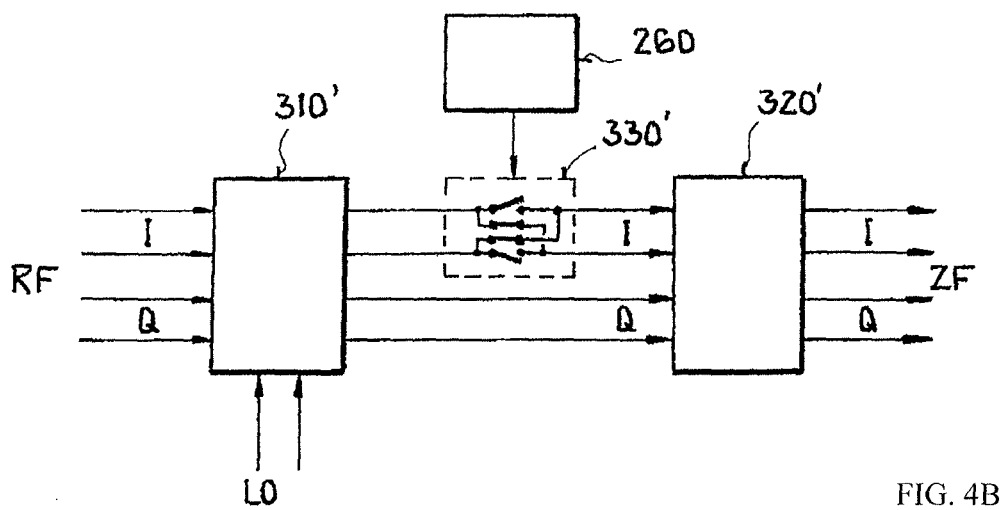

In the exemplary embodiment of FIGS. 4A and 4B, the inphase component I, the real part, and the quadrature phase component Q, the imaginary part, are applied as differential signals at mixer 310, 310' and sideband filter 320, 320'. The filtering of the top or bottom sideband is set by switching by switching means 330, 330'. Switching means 330, 330' are formed in the exemplary embodiments of FIGS. 4A and 4B as an intermediate switch, which for setting of the sideband to be filtered cause a 180° phase rotation of the quadrature phase Q in the exemplary embodiment of FIG. 4A and a 180° phase rotation of the inphase I in the exemplary embodiment of FIG. 4B. Switching means 330, 330' are controlled by a control circuit 160 or 260, which may be, for example, a microcontroller of a node A, B.

In addition, for controlling switching means 330 or 330', control circuit 160 of the first node A is set up to trigger the measurement of the phase φ at at least two predefined times t2, t4. To control the phase measurement at the at least two predefined times t2, t4, control circuit 160 is connected, for example, to a control input en of phase measurement unit 140. For example, at the at least two predefined times t2 and t4, a value of the phase cp is calculated or at the at least two predefined times t2 and t4, the current value of the continuously calculated phase cp is stored.

Control circuit 260 of the second node B is also set up to trigger the measurement of the phase ϕ at at least two predefined times t1, t3. To control the phase measurement at the at least two predefined times t1, t3, control circuit 260 is connected, for example, to a control input en of phase measurement unit 240.

A time interval between the at least two predefined times t2, t4 of control circuit 160 in the first node A and a time interval between the at least two predefined times t1, t3 of control circuit 260 in the second node B are the same in this case. Therefore, a time interval between phase measurements of the first frequencies and a time interval between phase measurements of the second frequencies is also the same after a frequency step Δf. If additional phases at additional (carrier) frequencies are to be measured, then, these as well are controlled by control circuit 160, 260 in a same time interval.

Furthermore, control circuit 160 of the first node A is set up to control a first multiplication factor in phase-locked loop 120. Control circuit 260 of the second node B is set up to control a second multiplication factor in phase-locked loop 220 of the second node B. The frequencies, differing by the intermediate frequency, of oscillator signals LO1, LO2 of the first node A and of the second node B are controlled by the multiplication factors. For example, the frequencies of oscillator signals LO1, LO2 are changed in steps.

Figure 5:
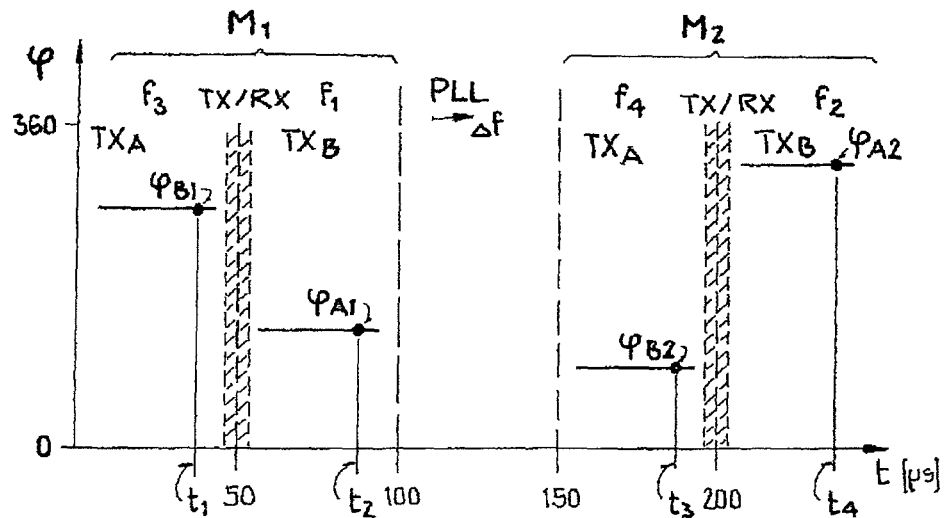
FIG. 5 shows a fourth schematic diagram with phase measurements of two nodes of a radio network.

A diagram for a measurement process for phase measurement is shown schematically in FIG. 5. In the method for distance measurement between the first node A and the second node B, a first unmodulated carrier signal with a carrier frequency f3 is transmitted by the first node A and received by the second node B. A second unmodulated carrier signal with a carrier frequency f1 is transmitted by the second node B and received by the first node A. Carrier frequency f1 differs from carrier frequency f3 by the amount of an intermediate frequency fZF. In the exemplary embodiment of FIG. 5, the intermediate frequency IZF is the same in both nodes.

A first value ϕA1 of a first phase is measured at a first measurement time t2 by the first node A. A third value ϕB1 of a second phase is measured at a third measurement time t1 by the second node B.

This is followed by an increase in the carrier frequency f3 by a frequency difference Δf to the increased carrier frequency f4. At the same time, an increase in the carrier frequency f1 by the same frequency difference Δf to the increased carrier frequency f2 occurs. The first unmodulated carrier signal is transmitted with the increased carrier frequency f4 by the first node A and received by the second node B. The second unmodulated carrier signal is transmitted with the increased carrier frequency f2 by the second node B and received by the first node A. The increased carrier frequency f4 as well differs from the increased carrier frequency f2 by the amount of an intermediate frequency fZF. In the exemplary embodiment of FIG. 5, the intermediate frequency fZF is again the same in both nodes.

Figure 6:
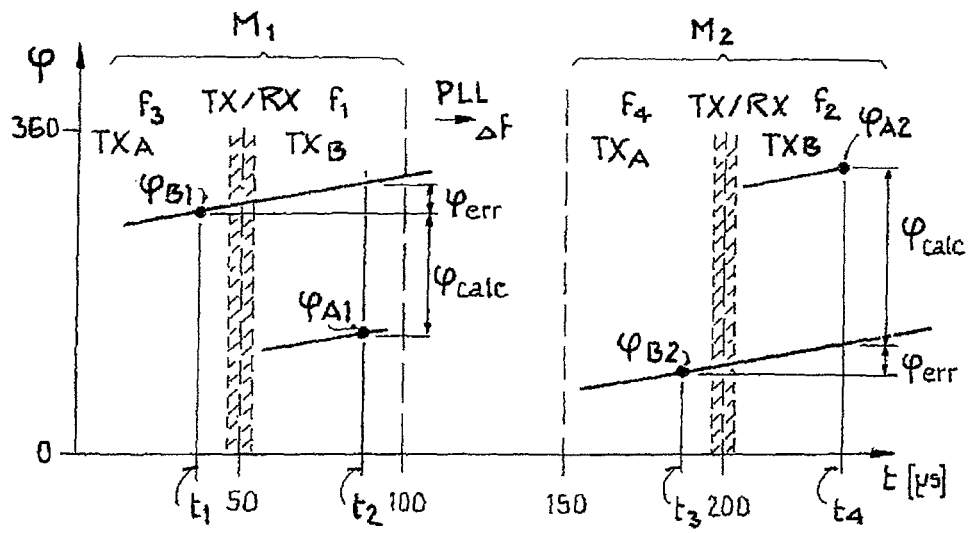
FIG. 6 shows a fifth schematic diagram with phase measurements of two nodes of a radio network.

After the increase in the carrier frequencies f2, f4, a second value ϕA2 of the first phase is measured at a second measurement time t4 by the first node A. A fourth value ϕB2 of a second phase is measured at a fourth measurement time t3 by the second node B. In an intermediate phase in each case, which is shown as shaded in FIGS. 5 and 6, the first node A and the second node B switch between transmitting TX and receiving RX. The technical effect is achieved in this regard that the frequency of phase-locked loops 120. 220 for two measurements in both directions is not switched between the nodes A, B, so that no settling process of the phase-locked loop 120, 220 occurs.

In the rather theoretical case of FIG. 5, there is no frequency offset between the frequencies f(XOSC1, XOSC2) of first reference clock generator 110 for clocking phase-locked loop 120 of the first node A and of second reference clock generator 210 for clocking phase-locked loop 220 of the second node B. FIG. 5 is intended first to represent only the rather theoretical case that the frequencies f(XOSC1, XOSC2) of the reference clock generators are exactly the same. The measured phase cp is therefore constant during the time 1.

In the exemplary embodiment of FIG. 5, phase-locked loops 120, 220 require, for example, 50 μs or less to settle. Both phase measurements M2 are then repeated at times t3 and t4 for the frequencies f4 and f2, whereby the second phase value ϕA2 of the first phase are determined in the first node A and the fourth phase value ϕB2 of the second phase in the second node B. Thus, the first value ϕA1 of the first phase is assigned to carrier frequency f1 and the third value ϕB1 of the second phase is assigned to carrier frequency f3. The second value ϕA2 of the first phase is assigned to the increased carrier frequency f4. The fourth value ϕB2 of the second phase is assigned to the increased carrier frequency f2.

A phase difference h.<p can be calculated from the phase values ϕA1, ϕB1, ϕA2, and ϕB2 as follows:

$$\Delta\phi = (\phi_{A2} - \phi_{B2}) - (\phi_{A1} - \phi_{B1}) \tag{2a}$$

By conversion, one obtains:

$$\Delta\phi = (\phi_{A2} - \phi_{A1}) - (\phi_{B2} - \phi_{B1}) \tag{2b}$$

Thus, the distance d can be calculated as follows:

$$d = \frac{\Delta\varphi c}{\pi \Delta f} \tag{3}$$

In a departure from the rather theoretical presentation in FIG. 5, in reality nodes A, B will have reference clock generators 110, 210, whose frequencies f(XOSC1), f(XOSC2) have a frequency offset, for example, because of fabrication tolerances or different temperatures. As a result, the phase ϕ in the respective receiving node changes, as is shown schematically by the slopes of the phase profiles in FIG. 6.

The phase change in the measurement M1 between the measurement times t1 and t2 causes a phase error ϕerr in a specific phase ϕcalc. The same phase error ϕerr arises in the measurement M2 at measurement times t3 and t4, when a time interval between the phase measurement M1, M2 is sufficiently small. If the time intervals t2-t1 and t4-t3 or the time intervals t3-t1 and t4-t2 are the same, the phase error (pen is also the same and drops out during the calculation of the phase difference Δϕ (see Equation (2a/2b)). As a result, the distance measurement based on the phase measurement can also be used when reference clock generators 110, 210 of both nodes A, Bare unsynchronized, as in the exemplary embodiment of FIG. 1A.

Figure 2:
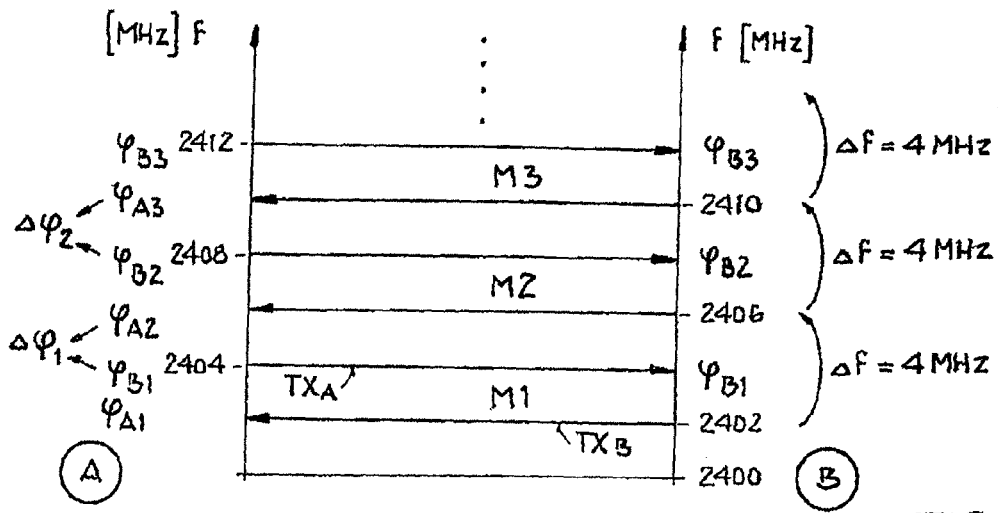
FIG. 2 shows a second schematic diagram.

To circumvent the problem of multipath propagation, phase measurements are advantageously made over the entire available band. A diagram of the measurements M1, M2, M3, etc., is shown in FIG. 2. N+1 measurements are performed, whereby phase differences Δϕ are being measured from adjacent frequencies N. It is necessary for this purpose that the individual measured phases ϕA1, ϕB1, ϕA2, ϕB2, ϕA3, ϕB3, etc., are brought together in an arithmetic unit of a node A, B.

For example, the phases φB1, φB2, φB3 are transmitted by standard communication in the radio network from the second node B to the first node A.

The following applies for calculating two phase differences:

$$\Delta\phi_1 = (\phi_{A2} - \phi_{B2}) - (\phi_{A1} - \phi_{B1}) \quad (4)$$

and $$\Delta\phi_2 = (\phi_{A3} - \phi_{B3}) - (\phi_{S2} - \phi_{B2}) \quad (5)$$

or in general for any number of phase differences:

$$\Delta\phi_N = (\phi_{A,N+1} - \phi_{B,N+1}) - (\phi_{A,N} - \phi_{B,N}) \quad (6)$$

Each phase difference can be converted to a distance dN using the equation $$d_N = \frac{\Delta\varphi_N c}{\pi \Delta f} \quad (7)$$

The distance values dN will differ clearly because of multipath propagation.

In a first exemplary embodiment for evaluating the N distance measurements, the average of the distance values dN is formed. Simulations have shown that this method produces relatively accurate results, when the multipath propagation is moderate. In other words, the component with the shortest connection (line of sight) of the channel impulse response dominates.

In a second exemplary embodiment for evaluation the N distance measurements, the amplitude of the receive signal is measured in addition in node A, B and stored for each frequency. The complex spectral component is calculated from the amplitude and phase for each frequency as $$I_N + jQ_N = A_N(\cos(\phi_N) + j \cdot \sin(\phi_N)) \quad (8)$$

The channel impulse response is calculated from the N spectral values by an inverse rapid Fourier transformation (IFFT). The first impulse (the component with the shortest line of sight) can be found using a search algorithm and thereby its transit time. This method is clearly more costly than averaging, but produces reliable results with strong multipath propagation as well.

Figure 3A:
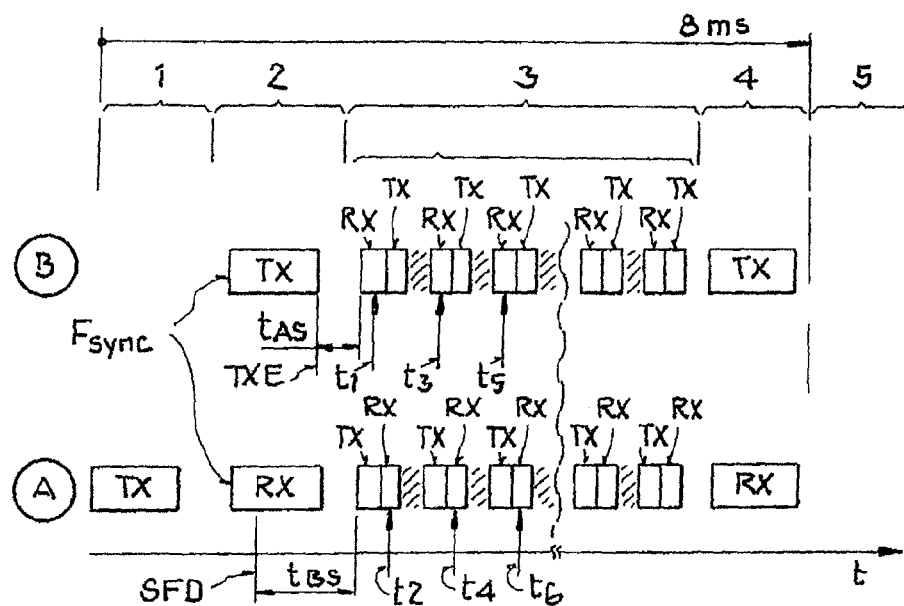
FIGS. 3A and 3B show schematically a course of a measurement process.
Figure 3B:

A course of a measurement process is shown schematically as a diagram in FIGS. 3A and 3B. The first node A initializes the distance measurement and in step 1 transmits a frame to the second node B with the command to perform a distance measurement. The transmission frequency fTX in this case is set to the channel frequency fch for communication in the radio network. The setting for filtering of a sideband is transmitted with the frame to the second node B. Alternatively, it is also possible to predefine fixedly which node A, B filters out the top or bottom sideband. In addition, a sequence of measuring frequencies or frequency steps is transmitted to the second node B. Alternatively, the sequence of the measuring frequencies for a phase measurement can also be fixedly predefined.

In step 2 of the process in FIG. 3A, the second node B transmits a frame Fsync to the first node A for time synchronization of the further process course for the distance measurement. The frame Fsync for time synchronization is, for example, a standard frame, which is formed according to a standard (for example, industry standard IEEE 802.15.4) and may have, for example, a preamble, a data header, and data to be transmitted. No data transmission is necessary for synchronization, so that an empty frame can be transmitted. In this respect, the time necessary for the transmission of the frame Fsync for time synchronization is known, i.e., for transmission by the second node B and receiving by the first node A. The second node starting at end time TXE of the transmitted frame Fsync starts a timer with the length tAS, which ends at the start of the distance measurement. The first node A also starts a timer with the length tBS, which also ends at the start of the distance measurement. The timer of the first node A is started by the determination of the time SFD (in industry standard IEEE 802.15.4, this corresponds to an indicator of an end of the preamble in the frame) in the received frame Fsync for the time synchronization.

Proceeding from the end of the timer of the second node B, measurement times t1, t3, t5, etc., for measuring the phase are established. Proceeding from the end of the timer of the first node, measurement times t2, t4, t6, etc., for measuring the phase are established. To determine the distance, it is necessary in this case that the time interval between measurement times t1, t3, t5, etc., in the second node B and the time interval between the measurement times t2, t4, t6, etc., in the first node are the same and constant. The time interval is predefined. The predefined time interval can be fixedly implemented. Alternatively, the time interval for predefining is agreed upon between nodes A, B. Beyond the measurement times shown in FIG. 3A, additional measurement times, which are not shown in the simplified illustration in FIG. 3A, in the same time interval are necessary for the N measurements.

In step 3, the transmission frequency fTX is switched from the preceding communication frequency fch to the lowest frequency. In this case, the local frequencies of the local oscillators differ by approximately the intermediate frequency of the intermediate frequency signal ZF. During the times tAS and tBS until the end of the timer, the phase-locked loops 160, 260 of the nodes A, B settle. The setting of the lowest frequency in the ISM band, for example, to the value 2404 MHz is shown schematically for node A in FIG. 3B. First, the node A transmits in the transmission mode TX. In the meantime, the second node B receives in the receive mode RX and measures the phase at time t1 and stores the phase value. Next, the second node B transmits without a change in the frequency of its local oscillation and a phase value is measured and stored in the first node A at measurement time t2.

The transmission frequency fTX is then increased in each node by a frequency step Δf and the phase-locked loops settle again, whereby the frequency offset between the local oscillators of nodes A and B is again equal to the intermediate frequency of the intermediate frequency signal ZF. Then, at times t3 and t4 new phase values are measured and stored. This process repeats up to the highest frequency in the band of 2480 MHz. The increase is shown schematically in FIG. 3B. In step 3, therefore, N measurements are taken with different transmission frequencies fTX.

In step 4, both nodes A, B switch back to the network frequency fch. The second node B transmits the measured and stored phase values back to the first node A by means of a standard communication in the radio network. In step 5, the node A calculates the distance d between the nodes A, B from this phase information and its own phase measurements.

The invention is not limited to the shown embodiment variants in FIGS. 1A through 6. For example, it is possible to provide a different sequence of frequencies for phase measurement, for example, from the highest to the lowest transmission frequency fTX.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method, comprising:
   transmitting, by a first node in a radio network, a first radio frequency (RF) signal with a first frequency;
   receiving, by the first node, a second RF signal with a second frequency by downmixing the second RF signal to an intermediate frequency, the second RF signal transmitted by a second node in the radio network in response to receiving the first RF signal;
   determining, by the first node, a first value of a first phase for the second frequency;
   transmitting, by the first node, a third RF signal with a third frequency, the first frequency and the third frequency having a frequency difference;
   receiving, by the first node, a fourth RF signal with a fourth frequency, the second frequency and the fourth frequency having the frequency difference, the fourth RF signal transmitted by the second node in response to receiving the third RF signal; and
   determining, by the first node, a second value of the first phase for the fourth frequency, the first frequency and the second frequency being spaced apart by an amount of the intermediate frequency, the third frequency and the fourth frequency being spaced apart by the amount of the intermediate frequency.

2. The method of claim 1, further comprising calculating a distance between the first node and the second node at least from the first value and the second value of the first phase and from a first value of a second phase for the first frequency and a second value of the second phase for the third frequency and from the frequency difference.

3. The method of claim 2, further comprising:
   transmitting to the second node the first value of the first phase and the second value of the first phase.

4. The method of claim 2, further comprising:
   receiving from the second node the first value of the second phase and the second value of the second phase; and
   calculating, by the first node, the distance based on the first value of the second phase and the second value of the second phase.

5. The method of claim 1, further comprising:
   transmitting, by the first node, a fifth RF signal with a fifth frequency, the third frequency and the fifth frequency having the frequency difference;
   receiving, by the first node, a sixth RF signal with a sixth frequency, the fourth frequency and the sixth frequency having the frequency difference, the sixth RF signal transmitted by the second node in response to receiving the fifth RF signal;
   determining, by the first node, a third value of the first phase for the sixth frequency, the fifth frequency and the sixth frequency of the sixth RF signal being spaced apart by the amount of the intermediate frequency; and
   calculating, by the first node, a distance between the first node and the second node at least from the first value, the second value, and the third value of the first phase; a first value of a second phase for the first frequency, a second value of the second phase for the third frequency, and a third value of the second phase for the fifth frequency; and the frequency difference.

6. The method of claim 1, wherein the first RF signal and the second RF signal are transmitted in a same time interval delayed in time.

7. The method of claim 1, wherein a time interval between determining the first value of the first phase for the second frequency and determining the second value of the first phase for the fourth frequency is substantially the same as a time interval between determining a first value of a second phase for the first frequency and determining a second value of the second phase for the third frequency.

8. The method of claim 1, wherein the second RF signal is received by the first node and in a bottom sideband is passed through a sideband filter below the first frequency.

9. The method of claim 1, wherein the first RF signal, the second RF signal, the third RF signal, and the fourth RF signal are transmitted according to industry standard Institute of Electrical and Electronics Engineers (IEEE) 802.15.1.

10. The method of claim 1, wherein the first RF signal, the second RF signal, the third RF signal, and the fourth RF signal are transmitted according to industry standard Institute of Electrical and Electronics Engineers (IEEE) 802.15.4.

11. A circuit of a first node of a radio network, the circuit comprising:
    a transceiver configured to:
        transmit a first radio frequency (RF) signal with a first frequency;
        receive a second RF signal with a second frequency by downmixing the second RF signal to an intermediate frequency, the second RF signal transmitted by a second node in the radio network in response to receiving the first RF signal;
        transmit a third RF signal with a third frequency, the first frequency and the third frequency having a frequency difference; and
        receive a fourth RF signal with a fourth frequency, the second frequency and the fourth frequency having the frequency difference, the fourth RF signal transmitted by the second node in response to receiving the third RF signal;
    a phase measurement unit configured to:
        determine a first value of a first phase for the second frequency; and
        determine a second value of the first phase for the fourth frequency, the first frequency and the second frequency being spaced apart by an amount of the intermediate frequency, the third frequency and the fourth frequency being spaced apart by the amount of the intermediate frequency.

12. The circuit of claim 11, configured to transmit to a second node the first value of the first phase and the second value of the first phase.

13. The circuit of claim 11, configured to:
    receive from the second node a first value of a second phase for the first frequency and a second value of the second phase for the third frequency; and
    calculate a distance between the first node and the second node at least from the first value and the second value of the first phase and from the first value and the second value of the second phase and from the frequency difference.

14. The circuit of claim 11, wherein:
    the transceiver is configured to:
        transmit a fifth RF signal with a fifth frequency, the third frequency and the fifth frequency having the frequency difference;
        receive a sixth RF signal with a sixth frequency, the fourth frequency and the sixth frequency having the frequency difference, the sixth RF signal transmitted by the second node in response to receiving the fifth RF signal;

the phase measurement unit is configured to determine a third value of the first phase for the sixth frequency, the fifth frequency and the sixth frequency of the sixth RF signal being spaced apart by the amount of the intermediate frequency; and the circuit is configured to calculate a distance between the first node and the second node at least from the first value, the second value, and the third value of the first phase; a first value of a second phase for the first frequency, a second value of the second phase for the third frequency, and a third value of the second phase for the fifth frequency; and the frequency difference.

15. The circuit of claim 11, wherein the first RF signal and the second RF signal are transmitted in a same time interval delayed in time.

16. The circuit of claim 11, wherein a time interval between determining the first value of the first phase for the second frequency and determining the second value of the first phase for the fourth frequency is substantially the same as a time interval between determining a first value of a second phase for the first frequency and determining a second value of the second phase for the third frequency.

17. The circuit of claim 11, wherein the first RF signal, the second RF signal, the third RF signal, and the fourth RF signal are transmitted according to industry standard Institute of Electrical and Electronics Engineers (IEEE) 802.15.1.

18. The circuit of claim 11, wherein the first RF signal, the second RF signal, the third RF signal, and the fourth RF signal are transmitted according to industry standard Institute of Electrical and Electronics Engineers (IEEE) 802.15.4.

19. The circuit of claim 11, further comprising:
a control circuit configured to control a mode for distance measurement;
a local oscillator configured to set a frequency of the distance measurement, the frequency comprising one of a transmission frequency and a reception frequency;
a sideband filter configured to filter a receive signal of the distance measurement; and
a switch connectable to the control circuit for controlling a switch position, wherein:
the sideband filter and the switch are connected for switching the filtering between a top sideband of the frequency and a bottom sideband of the frequency, and
the control circuit is configured to control the switching of the filtering as a function of the mode for distance measurement.

20. A system having a first node and a second node of a radio network, the system configured to:
transmit, by the first node in the radio network, a first radio frequency (RF) signal with a first frequency that is received by the second node in the radio network by downmixing to a first intermediate frequency, the second node configured to determine a first value of a first phase for the first frequency;
transmit, by the second node, a second RF signal with a second frequency that is received by the first node by downmixing to a second intermediate frequency, the first node configured to determine a first value of a second phase for the second frequency;
transmit, by the first node, a third RF signal with a third frequency, the first frequency and the third frequency having a frequency difference, the second node configured to determine a second value of the first phase for the third frequency;
transmit, by the second node, a fourth RF signal with a fourth frequency, the second frequency and the fourth frequency having the frequency difference, the first node configured to determine a second value of the second phase for the fourth frequency, an amount of the first intermediate frequency and the second intermediate frequency being the same, the first frequency and the second frequency being spaced apart by the amount of the first and second intermediate frequency, the third frequency and the fourth frequency being spaced apart by the amount of the first and second intermediate frequency; and
calculate a distance between the first node and the second node from the first value and the second value of the first phase and from the first value and the second value of the second phase and from the frequency difference.

* * * * *

UNITED STATES PATENT AND TRADEMARK OFFICE
CERTIFICATE OF CORRECTION

PATENT NO. : 9,274,218 B2
APPLICATION NO. : 13/849166
DATED : March 1, 2016
INVENTOR(S) : Kluge et al.

It is certified that error appears in the above-identified patent and that said Letters Patent is hereby corrected as shown below:

In the Specification

Column 2, Line 9; Delete "6,731,908 82" and insert -- 6,731,908 B2 --, therefor.

Column 6, Line 15; Delete "limitative" and insert -- limitive --, therefor.

Column 9, Line 40; Delete "IZF" and insert -- fZF --, therefor.

Column 9, Line 53; Delete "12" and insert -- f2 --, therefor.

Column 11, Line 10; Delete "$\Delta\square_2=(\square_{A3}-\square_{B3})-(\square_{S2}-\square_{B2})$," and insert -- $\Delta\square_2=(\square_{A3}-\square_{B3})-(\square_{A2}-\square_{B2})$ --, therefor.

Signed and Sealed this
Seventh Day of June, 2016

Michelle K. Lee
*Director of the United States Patent and Trademark Office*